United States Patent [19]
Bourgoin et al.

[11] Patent Number: 5,804,709
[45] Date of Patent: Sep. 8, 1998

[54] CANTILEVER DEFLECTION SENSOR AND USE THEREOF

[75] Inventors: Jean-Philippe M. Bourgoin, Montigny le Bx, France; Matthew B. Johnson, Norman, Okla.; Bruno Michel, Gattikon, Switzerland

[73] Assignee: International Business Machines Corporation, Armonk, N.Y.

[21] Appl. No.: 718,339

[22] PCT Filed: Feb. 7, 1995

[86] PCT No.: PCT/EP95/00431

§ 371 Date: Oct. 3, 1996

§ 102(e) Date: Oct. 3, 1996

[87] PCT Pub. No.: WO96/24819

PCT Pub. Date: Aug. 15, 1996

[51] Int. Cl.⁶ .................................................. G01B 7/34
[52] U.S. Cl. ........................................ 73/105; 250/306
[58] Field of Search .............................. 73/105; 250/306, 250/307

[56] References Cited

U.S. PATENT DOCUMENTS

| | | | |
|---|---|---|---|
| 4,724,318 | 2/1988 | Binnig | 250/306 |
| 4,851,671 | 7/1989 | Pohl | 250/306 |
| 5,065,103 | 11/1991 | Slinkman et al. | 324/458 |
| 5,171,992 | 12/1992 | Clabes et al. | 250/306 |
| 5,267,471 | 12/1993 | Abraham et al. | 73/105 |
| 5,354,985 | 10/1994 | Quate | 250/306 X |
| 5,444,244 | 8/1995 | Kirk et al. | 250/306 |
| 5,445,011 | 8/1995 | Ghislain et al. | 73/105 |
| 5,461,907 | 10/1995 | Tench et al. | 73/105 |
| 5,465,046 | 11/1995 | Campbell et al. | 324/244 |
| 5,517,280 | 5/1996 | Quate | 355/71 |

OTHER PUBLICATIONS

*Patent Abstracts of Europe* (EP–290648) dated Nov. 17, 1988 "Atomic Force Sensor Head for Investigating the Topography of a Surface", Binnig et al.

*Electronic Letters* 3 Dec. 1992, UK, vol. 28, No. 25, pp. 2302–2303 A.S. Hou et al. "Picosecond Electrical Sampling using a Scanning Force Microscope".

*Physical Review B (Condensed Matter)* 15 May 1990, USA, vol. 41, No. 14 pp. 10229–10232, W. Krieger et al. "Generation of Microwave Radiation in the Tunneling Junction of a Scanning Tunneling Microscopic".

*Primary Examiner*—Thomas P. Noland
*Attorney, Agent, or Firm*—Stephen S. Strunck

[57] ABSTRACT

A new method and an apparatus for measuring the deflection of or the force exerted upon a cantilever-type micromechanical element is presented which is based on detecting radiation emitted from the gap between the cantilever (220) and a second surface (230, 231). The radiation, while occurring spontaneously at high frequencies when appropriately biasing the cantilever and the second surface by a voltage, can be enlarged by using external energy sources. The new method and apparatus is also applied to surface investigation, particularly to dopant profiling.

20 Claims, 8 Drawing Sheets

CANTILEVER DEFLECTION SENSOR AND USE THEREOF

This invention relates generally to to means for measuring the forces and/or deflections of cantilever type elements, as encountered for example in the field of Atomic Force Microscopy (AFM). The invention further relates to a method and apparatus for determining material properties. In particular, it relates to a dopant profiler based on a scanning probe microscope involving the generation and detection of higher harmonics of an applied electromagnetic field.

BACKGROUND OF THE INVENTION

The Atomic Force Microscope as first known from the U.S. Pat. No. 4,724,318 and further described by G. Binnig, C. F. Quate and Ch. Gerber in Phys. Rev. Letters, Vol.56, No.9, March 1986, pp.930–933, employs a sharply pointed tip attached (to a spring-like cantilever beam to scan the profile of a surface to be investigated. At the distances involved, minute forces occur between the atoms at the apex of the tip and those at the surface, resulting in a tiny deflection of the cantilever. In U.S. Pat. No. 4,724,318, this deflection is measured by means of a tunneling microscope, i.e., an electrically conductive tunnel tip is placed within tunneling distance from the back of the cantilever beam made also conductive, and the variations of the tunneling current are used to determine the deflection. With known characteristics of the cantilever beam, the forces occurring between the AFM tip and the surface under investigation can be determined.

The forces occurring between a pointed tip and a surface are usually described as van-der-Waals, covalent, ionic, or repulsive core interaction forces.

An important aspect of AFM is to accurately determine the deflection of the cantilever. One group of these defection measuring methods is based on coupling the cantilever to another distance sensitive microscope. A combination of the cantilever with a scanning tunneling microscope is described, for example, in the above mentioned patent U.S. Pat. No. 4,724,318. Another approach using an evanescent wave coupling sensor, also known as scanning near-field optical microscope (SNOM) or scanning tunneling optical microscope (STOM), is described by Diaspro and Aguilar in: Ultramicroscopy 42–44 (1992), pp. 1668–1670.

Another group of detecting methods is based on the well known piezoelectric or piezoresistive effect. An example is described in: M. Tortonese et al., Appl. Phys. Lett. 62(8), 1993, pp.834–836. These methods provide detection schemes in which the deflection detector is integrated in the cantilever.

Yet another feasible way of detecting the displacement of the cantilever relies on capacitance sensing and is known, for example, from Joyce et al., Rev. Sci. Instr. 62(1991), p. 710, and Göddenhenrich et al., J. Vac. Sci. Technol. A8(1990), p. 383, and the European patent application EP-A-0 290 648.

By this application as well as from U.S. Pat. No. 4,851,671 methods are known use the changes in the resonance frequencies of the flexible element and higher harmonics thereof to measure its bending. The frequencies are detected either by a quartz oscillator or by a capacitance additionally attached to the cantilever.

The displacement of the flexible element can also be measured by applying optical methods, such as beam deflection or interferometry. The beam deflection method makes use of the length of the lever. Usually, a light beam, preferably produced by a laser diode or guided through an optical fiber, is directed onto the lever. A small deflection of the lever causes a reasonable change in the reflecting angle and, therefore, results in a deflection of the reflected light beam that is measured with bicell or other suitable photo detectors. The beam deflection method is simple and reliable. It is described, for example, by Myer and Amer in Appl. Phys. Lett. 53 (1988), pp.1045–1047. Interferometric methods are described, for example, by Martin et al., J. Appl. Phys. 61(1987), p.4723, by Sarid et al., Opt.Lett. 12(1988), p.1057, and by Oshio et al., Ultramicroscopy 42–44(1992), pp.310–314. As the sensitivity of the SPM can be increased by building cantilevers with ever higher resonance frequencies while trying to maintain the Q factor, a tendency towards smaller cantilevers can be observed. For these cantilevers the above optical methods are prone to failure due to a diminished reflectivity and problems which arise from the limited focus size of a laser beam.

Present day very large scale integrated (VLSI) circuit technology demands an accurate knowledge of the spatial extent, density, or distribution in all three dimensions of the active components (dopants) which are introduced into a base or host material. The most common devices produced by VLSI are either bipolar or metal oxide semiconductor field effect (MOSFET) transistors, diodes or capacitors. The characteristic length scale—at present at about 0.5 microns—will shrink in the future to 350 nm and even to 100 nm. The concentration of dopants, for example arsenic, boron, or phosphorous, in an active region of a semiconducting device ranges typically from $10^{15}/cm^3$ to $10^{20}/cm^3$. It will become necessary to control the variation, or profile, of dopants with a lateral resolution of 10 nm and a vertical resolution of 2–3 nm to accomplish predictability in device behavior and control of the manufacturing process. However, currently known dopant profilers are unable to provide this high precision, at least in all three dimensions.

Known approaches to dopant profiling include junction staining as described by S. T. Ahn and W. A. Tiller in the J. Electrochem. Soc. 135 (1988), p. 2370, dopant density selective etching with Transmission Electron microscopy (TEM) as described in the J. Vac. Sci. Technol. B 10 (1992), p. 491, by H. Cerva, Secondary-Ion Mass Spectroscopy (SIMS), Spreading Resistance (SR), and macroscopic Capacitance-Voltage (C-V) measurement, all described for example in S. M. Sze, "VLSI Technology", McGraw-Hill Book Co., New York, 1983 (in particular chapters 5 and 10). Other methods, currently under development are dopant density selective etching with a Scanning Tunneling Microscope (STM), which is known from L. P. Sadwick et al., J. Vac. Sci. Technol. B 10 (1992), p. 468, planar STM, described by H. E. Hessel et al. in J. Vac. Sci. Technol. B 9 (1991), p. 690, and cross-sectional STM, described by J. M. Halbout and M. B. Johnson in J. Vac. Sci. Technol. B 10 (1992), p. 508. Though being in some aspects useful, these techniques suffer from several drawbacks: they are either destructive or require a careful sample preparation, or have a limited lateral resolution or sensitivity to dopants.

One of the most recent methods to determine the dopant concentration is the Scanning Capacitance Microscope described in the U.S. Pat. No. 5,065,103. It shows features of the scanning probe microscopy and of the conventional C-V technique. But even the Scanning Capacitance Microscope lacks a sufficient lateral resolution as will be required in the future. Further, it employs a lock-in technique to reduce the noise due to stray capacitance thus slowing down the scan process and makes a high throughput by this method improbable.

Another method, described in U.S. Pat. No. 5,267,471, employs a cantilever with two different mechanical resonant frequencies. When using this device as a capacitance sensor, fractions of the resonant frequencies are applied to the cantilever, and its movement is monitored by a laser interferometer and a subsequent lock-in amplifier. As above, the use of a lock-in amplifier severely restricts the bandwidth of the measurement.

The principles of scanning probe microscopies based on field-induced higher harmonic generations (SHM) are described for example by G. P. Kochanski in Phys. Rev. Lett. 62 (1989), No. 19, pp. 2285–2288, by W. Seifert et al. in Ultramicroscopy 42–44 (1992), pp. 379–387, by B. Michel et al. in Rev. Sci. Instrum. 63 (9), Sept. 1992, pp. 4080–4085, and by S. J. Stranick and P. S. Weiss in Rev. Sci. Instrum. 64 (5), May 1993, pp. 1232–1234. In SHM techniques an electromagnetic field of Radio (rf) to optical frequencies, is applied to the tunneling gap of a conventional scanning tunneling microscope (STM). Due to some electric properties of the tunneling gap, which are believed to be either non-linearities of the current-voltage curve or space-charge effects, higher frequencies (harmonics) are generated. Using these higher harmonics as feedback for the STM tip positioner, isolating films and semiconductors can be scanned. However, the feedback loop fails over a conducting surface, leading to a crash of the fragile tip on the surface. This fallacy prevents the large scale use of the SHM as an instrument for dopant profiling, as conducting areas are regularly encountered on an integrated circuit.

With regards to the described limitations of the art, it is therefore an object of the invention to provide an apparatus for determining the deflection of a cantilever which is particular suitable for cantilevers with small dimensions and hence very high resonance frequencies. A further object of the invention is a non-destructive method and apparatus to determine characteristic properties of a material, in particular the dopant profile, with a resolution expansible below 100 nm. The method and apparatus should be equally applicable to conductive and non-conductive surfaces. It is another object of the invention to increase the bandwidth of the deflection measurement with regard to the known devices.

SUMMARY OF THE INVENTION

The above-mentioned and other objects and advantages are attained in accordance with the principles of the present invention as set forth in the appended claims.

Accordingly, in a basic variant the apparatus in accordance with the invention comprises a flexible cantilever, voltage biasing means to apply a DC voltage between the cantilever and either a sample to be investigated during operation of the apparatus or a "piggybacked" reference surface or tip, antenna means to receive radiation in the MHz and/or GHz range, and amplifying means designed to operate in this range. Due to non-linearities of either the resistance-to-voltage or capacitance-to-voltage characteristic of the interface between the cantilever and the second surface, the radiation emitted from the interface area has not only one (fundamental) frequency, but simultaneously contains components with higher frequencies, the so-called harmonic signals. Though in principle all these components can be used, it is found that in some embodiments of the invention advantageously harmonic signals, in particular the second and third harmonic signals, are exploited for measurements, as will be further described below. The preferred range of frequencies is 100 MHz to 100 GHz, whereby the lower limits is set by the efficiency of the higher harmonic generation and the upper limits reflects the currently available equipment for the generation and detection of high frequency signals.

The generation of higher harmonics requires usually that the cantilever and the second surface, which can either be the surface of a sample or of a "piggybacked" plane or tip, form an interface consisting of a semi- or non-conductive boundary and a conductive boundary. However, it is found that the sensitivity of a device in accordance with the invention supports an embodiment in which both surfaces are made of semiconducting materials. Thus, the device shows a high efficiency in the generation of higher harmonic signals, irrespective of the nature of the second boundary. As another advantage of the invention, a constant DC bias voltage can be chosen without the need of a re-adjustment when for example during a scan of the cantilever different surface materials are encountered.

The two boundaries are separated by preferably 0.1 nm to 100 nm. Using the voltage biasing means, a DC voltage can be applied to this interface. The oscillations of the cantilever then cause the emission of an electrical field signal oscillating with the resonance frequency and with higher harmonics, thereof, due to the non-linear capacitance-to-voltage characteristic of the interface. The emitted electrical field is detected by the antenna and the amplifier or the cascade of amplifiers and filters, preferably forming a spectrum analyzer. Variations of the force acting upon the tip of the cantilever, and hence the deflection of the cantilever can be detected as shifts in the frequency of the electrical field signal or in the amplitude of the cantilever's oscillation.

The basic variant of the invention can be augmented to a deflection detection and control apparatus by applying the output signal of the amplifier to feedback means which control positioning means, e.g., piezoelectric fine positioning systems, known as such in the art, allowing in combination a control of the position of the cantilever with atomic precision. This embodiment of the invention especially suitable for cantilevers with a resonance frequency of several hundred MHz or higher. These cantilevers are too small to apply known optical methods, such as beam deflection or interferometry, as the light can no longer be properly focussed and the amount of light reflected by the cantilever falls below current detection thresholds.

As described with respect to the U.S. Pat. No. 4,724,318, it is in principle known to use a "piggybacked" Scanning Tunneling Microscope (STM) to detect the deflection of a AFM cantilever. It will however become clear that the differences with respect to this invention result in several advantages. Tunneling current detection requires the tip to approach the back of lever up to less than one nm. This close distance causes a strong damping and is impractical when measuring large forces and force gradients, i.e., large deflections. Another reason which prevented the use of this method in commercially available AFM microscopes is the lack of stability of the tunneling gap under ambient conditions. With an apparatus in accordance with the invention, the gap width can be enlarged up to 50 nm. The damping of the silicon cantilever is much smaller, while the sensitivity for measuring deflection can be maintained at a very high level. In addition, the new apparatus does not suffer from the stability problems characteristic for an AFM with tunneling current detection of the deflection. It even can be performed on surfaces that are covered with an insulating, e.g, oxide or nitride, layer Embodiments of the invention can easily be applied to any type of existing cantilever without the need of an accurate adjustment or alteration of the cantilever itself. A device according to the invention is found to have a good signal-to-noise ratio and therefore does not require a lock-in amplifier, thereby increasing the bandwidth of the deflection measurement.

Obviously, the scope of the invention is not restricted to simple beam-shaped cantilevers with a single support. It can readily be applied to more complex designs of cantilevers, having for example two or more support points, a spiral-like shape, etc.

Further embodiments of the invention concern the antenna which receives the electrical field emitted from the interface region: The antenna can either be a distinct conductive element or an integral part of the cantilever, of the sample carrier, or of the piggybacked element. In latter cases, means for separating the bias voltage and other low frequency components from the high frequency signal are provided, such as "bias tee" connectors. The antenna can also be integrated into a cavity, preferably into a tunable cavity, as described for example by B. Michel et al. in Rev. Sci. Instrum. 63 (9), Sept. 1992, pp. 4080–4085. The use of a cavity allows the detection of a large percentage of the signal power provided that the cavity is tuned to the frequency of the signal. Without a cavity, a higher flexibility in measuring and instrument design is gained. The, however, reduced sensitivity may in this case be compensated by using specially designed high impedance filters and amplifiers.

A specific aspect of the invention is use of a device comprising a flexible cantilever and means for detecting higher harmonic electrical signals as described above for investigating heterogeneous surfaces, in particular for probing highly integrated circuits, i.e., dopant profiling.

It is known that the electrical signal emitted from the gap between tip and sample depends on the materials of which the boundaries of the interface are made of. However, the introduction of applicable dopant profilers failed so far as no known instrument has been versatile enough to cope with a complex surface as encountered in ICs. Though the scanning capacitance microscope is in principle able to scan across any surface, it has been impossible to maintain a high resolution under such arbitrary surface conditions. The invention solves this problem by using a device operable in an atomic force mode, in which the deflection of the cantilever is detected by any of the methods described above, and simultaneously enabling the detection of the electrical signal as emitted from the gap area.

Another embodiment further comprises means for generating an oscillating electrical field and coupling means to apply this field to the cantilever. In this embodiment, the frequency with which the gap between the tip of the cantilever and the surface of a sample is modulated is not determined by the resonance frequency of the cantilever but can be tuned to a predetermined value. This value may depend on the surface structure and composition of the sample to be investigated. Preferably a radio frequency or microwave frequency field is used. This embodiment is further improved by providing appropriate filter means to separate the fundamental frequency signal, which is obscured by the externally supplied signal, from its higher harmonics.

In a variant of this embodiment, the externally supplied oscillating electrical field is utilized to control amplitude and oscillation frequency of the cantilever. This control is especially efficient when tuning the externally supplied field to the resonance frequency of the cantilever. Similar effect can be achieved when the cantilever oscillation is driven by a piezoelectric or piezoresistive elements forming part of the cantilever body with said elements being excited by externally provided electrical signals. Another alternative to excite oscillation is by providing a sufficient amount of thermal energy to the cantilever, which in this case should have a bimorph structure including material with different thermal expansion coefficients. The heat supply to the cantilever can be enhanced by including suitable heating elements into the cantilever structure.

In another embodiment of the invention, the tip is attached to means for measuring the current flowing through the gap between the tip and the surface. Thus, either the (DC) tunnel current as known from the conventional STM can be determined or an AC current arising from a small number of electrons which tunnel onto and from the surface to be studied under the influence of the applied AC electromagnetic field as described by Kochanski. In the latter case also applies to an insulator.

Both currents can be used as input signal to the feedback loop of the positioning device, giving the operator of an apparatus according to this invention two to four different methods of controlling the gap width between tip and sample.

In a particular preferred embodiment of the invention, the tip and the cantilever of the force sensor are combined to an atomic force cantilever with a conductive cladding or coating. This cladding can be applied to a normal AFM cantilever by any suitable deposition technique well known in the art. This integrated tip structure reduces significantly the technical overhead as compared to a device in which a atomic force sensor has to be applied in parallel to the (metallic) tip of conventional scanning harmonic microscopes (SHMs).

It is immediately possible to apply the signal detection to an array of cantilevers, each tuned for example to a slightly different resonance frequency. The deflection of each cantilever can be accomplished by either coupling the input DC voltage or the input electromagnetic wave selectively to each one of these cantilevers or by tuning a frequency detection device to its resonance frequency.

The efficiency of the apparatus can be further enhanced by employing an enclosing chamber and means for controlling the humidity in the interface region as described for example by J. -P. Bourgoin et al. (International Conference on Micro- and Nano-Engineering MNE '94, Davos, Switzerland, Sep. 26–29, 1994) in case of a known scanning surface harmonic microscope. The humidity when set to an appropriate value gives rise to the formation of a tiny droplet in the interface region and thus concentrates the electrical field in this region.

These and other novel features believed characteristic of the invention are set forth in the appended claims. The invention itself however, as well a preferred mode of use, and further objects and advantages thereof, will best be understood by reference to the following detailed description of illustrative embodiments when read in conjunction with the accompanying drawings.

DESCRIPTION OF THE DRAWINGS

The invention is described in detail below with reference to the following drawings.

MODE(S) FOR CARRYING OUT THE INVENTION

Figure 1:
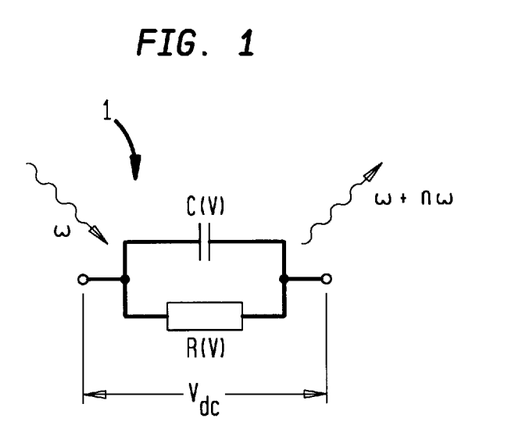
FIG. 1 shows a model of the tip-sample gap.

Referring now to FIG. 1, a RC parallel circuit 1 is shown as a model to facilitate the understanding of the generation of higher harmonics in the interface or gap separating a cantilever and a second surface. The RC parallel circuit 1 is an electrical model of this gap, to which a DC voltage is applied. The input microwave signal $\omega$ as generated in a microwave generator (not shown) is coupled into the gap area, for example via either the tip or the sample holder. The input microwave signal has a frequency $\omega$ The radiation emerging from the gap includes components with harmonic frequencies $n\omega$. These components are generated due to non-linearity of the resistance $R(V)$ and/or the capacitance $C(V)$ with respect to the voltage.

Figure 2A:
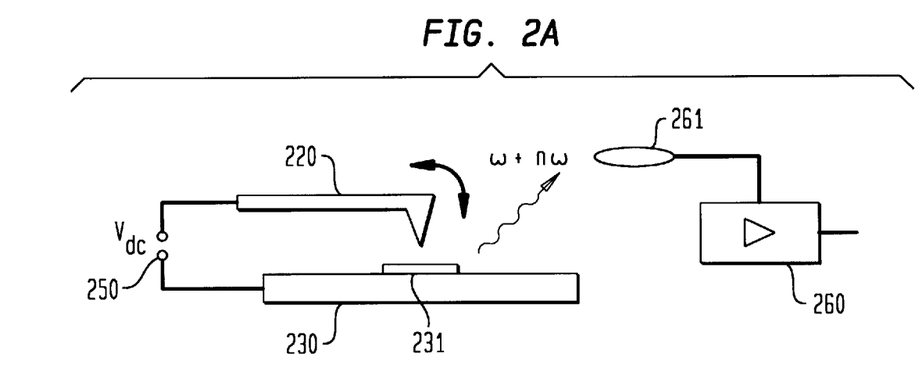
FIG. 2A shows a first embodiment of a deflection sensor in accordance with the invention.

Referring now to FIG. 2A, an example of the basic variant of the invention is shown schematically. A flexible cantilever 220 with a tip at its apex and the sample holder 230 with a sample 231 are connected to a DC voltage source 250, which provides an bias voltage across the interface. Due to the oscillations of the cantilever, which may either oscillate at its resonant frequency or at the frequency of an externally supplied signal, the gap between the tip and sample is modulated causing the emission of radiation including the fundamental $\omega$ and higher harmonic frequencies $n\omega$ signals. These signals are received by an antenna 261 and amplified in a microwave amplifier 260 for further processing (displaying, controlling, etc.). This simple variant of the invention is of particular interest when building large arrays of cantilevers. Every cantilever of an array may be tuned to a different base frequency. A spectrum analyzer is then employed to separate the contribution of each cantilever to the detected signal giving a ready possibility to observe the deflection of each cantilever in the array. The excitation energy necessary to balance the energy dissipation of the cantilever has to be provided in this basic variant externally, e.g. by heating, radiation, and the like. When no external field is supplied, it is desirable to have a high resonant frequency of the cantilever. Cantilevers which resonate at frequencies between 0.01 GHz and 1.0 GHz are known from Binh et al., Surface Science 301 (1994), L224.

Figure 2B:
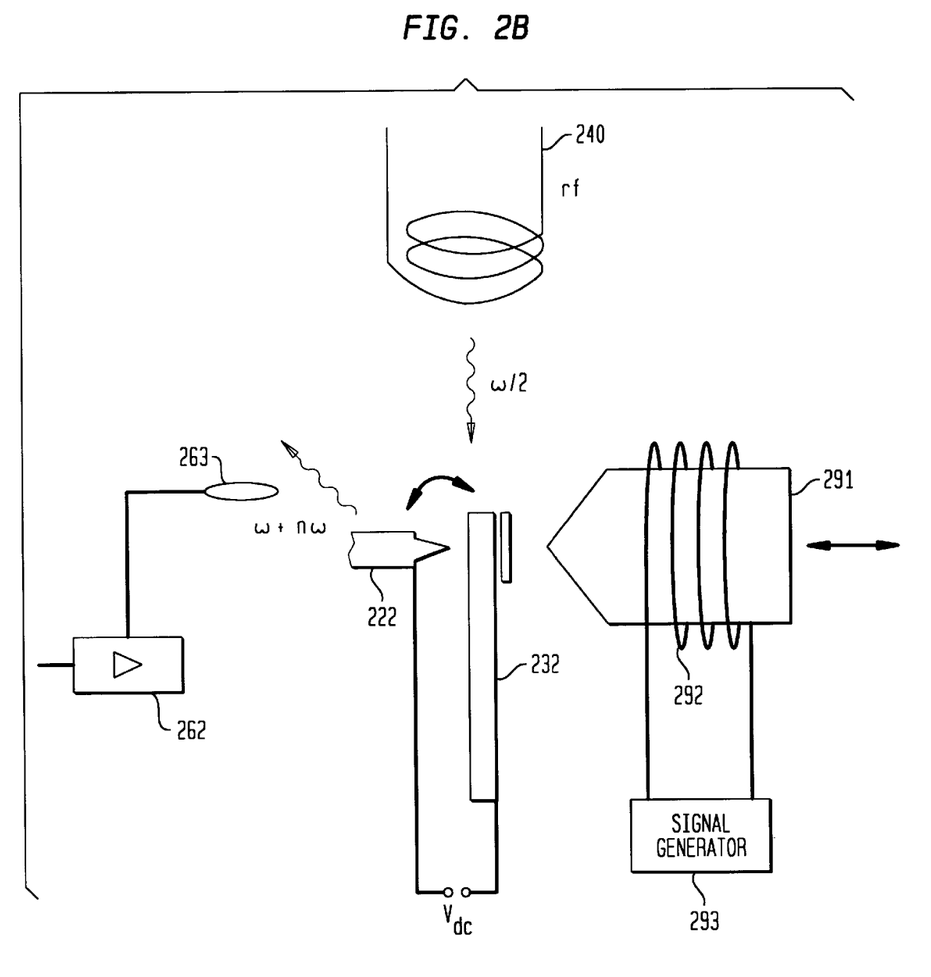
FIG. 2B shows a device for ESR measurements including a second embodiment of the invention.

FIG. 2B depicts means for externally exciting the lever oscillation by electromagnetic radiation 240. A device for measuring the electron spin resonance (ESR) of a sample is shown, which differs from the one described by Rugar et al. in NATURE 360, 563 (1992), in that the deflection of the cantilever is sensed by the detection of higher harmonics generated in the gap between the cantilever 232 carrying the ESR sample and a second (reference or "piggybacked") plane provided with a metallic tip 222. The rf coil 240, the magnet 291, and the sweep coil 292 are standard parts of an ESR measurement equipment. The modulation of the magnetic field at the sample gives rise to a cantilever vibration amplitude of typically around one nanometer, detected as a variation of the higher harmonic signal. This signal is generated in the gap between the tip 222 and the silicon cantilever 232. The signal generator 293 sweeps the magnetic field to bring the spins in resonance with the applied rf frequence, which is half of the resonance frequency of the cantilever. A detection circuit 262 is tuned to higher harmonics of this resonance frequency.

Figure 3A:
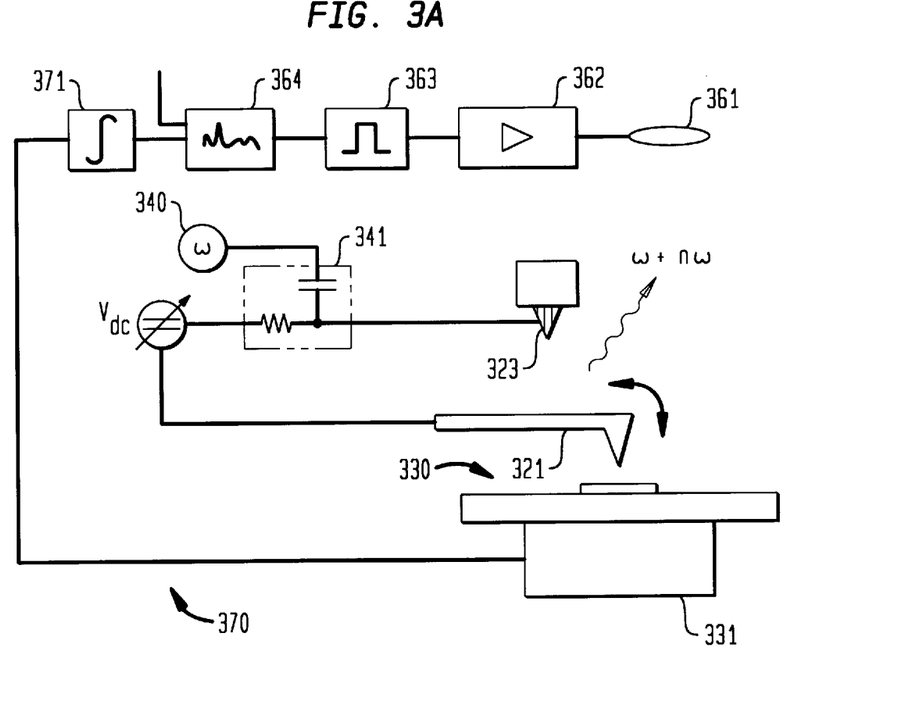
FIGS. 3A, B show further variants of the deflection sensor according to the invention.

Another variant of the invention is shown in FIG. 3A. In this example, the microscope particularly includes a cantilever 320 made of semiconducting material 321 Facing its back plane is a metallic tip 323, which is connected to a microwave source 340. A DC voltage is applied to the tip 323 and the cantilever 320. The voltage can be tuned to a value appropriate for the material of the cantilever. Further clamping means (not shown) are provided to keep the distance between tip and cantilever at a default value of 50 to 100 nm. It is important to notice that this gap width is well above the distance over which tunneling of electrons occurs, i.e. significantly larger than in case of the piggybacked STM described in the patent U.S. Pat. No. 4,724,318. The gap width is also large enough to prevent a collision of the tip 323 and the cantilever 320 under normal conditions, hence, it is not necessary to provide the tip with a positioning system controlled by another feedback loop. To run however this variant of the invention in a mode which is commonly known in the field of scanning force microscopy as "constant force mode," an integrating circuit 371 is provided, which controls the positioning means 331 of the sample as part of a feedback loop 370.

In the described variant further an external microwave signal is fed through the tip 323 to the gap between the tip and the cantilever. The input microwave signal source 340 is connected to the DC voltage circuit by a bias tee 341. The emitted radiation $\omega+n\omega$ is received by the antenna 361. The amplifying circuit includes a preamplifier 362, with a bandwidth ranging from 1 GHz to 4 GHz and an amplification of 40 dB, a band-pass filter 363 (2.1–3.5 GHz) for eliminating noise and unsought frequency components from the signal. The following spectrum analyzer 364 produces a frequency resolved display of the signal. The output of the spectrum analyzer can alternatively be used as input to the integrating circuit 371.

As another aspect of the invention, a unit comprising microwave source, antenna, amplifiers, and feedback circuit can be built attachable to any known atomic force microscope (AFM). The deflection of the AFM cantilever can be detected with an accuracy of approximately 10 picometer without encountering the stability problems which prevented the use of STM-based detection methods in commercial AFMs.

Figure 3B:
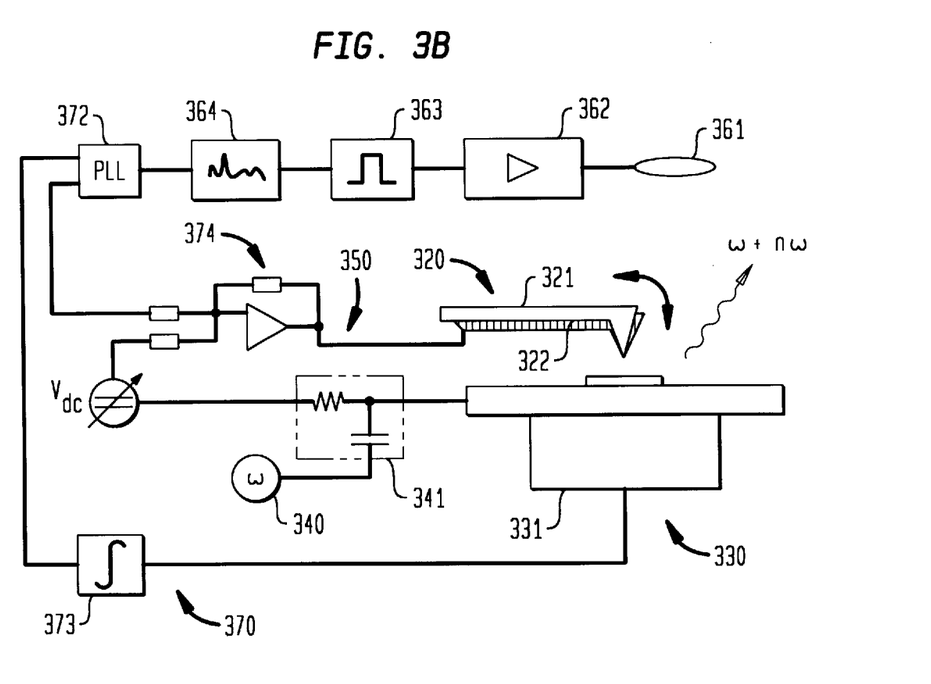

A compact design in accordance with the invention is shown in FIG. 3B, where the additional metallic tip is replaced by a metallic coating 322 of the cantilever 320. Further, the output of the spectrum analyzer 364 is connected to the input of a phase locked loop (PLL) 372 controller which forms part of two feedback loops 370, 350, the first of which is locked to the resonant frequency of the cantilever. This loop, which comprises a summer 374, is used to electrostatically excite the oscillation of the cantilever 320. As the PLL is responsive to frequency shifts in the signal, the shown device can be employed to measure the damping of the cantilevers oscillation. A constant damping mode can be achieved by connecting the rms (root mean square) output of the PLL after further smoothing by an integrator 373 as control signal to the positioning means 331 of the sample holder 330.

Figure 4A:
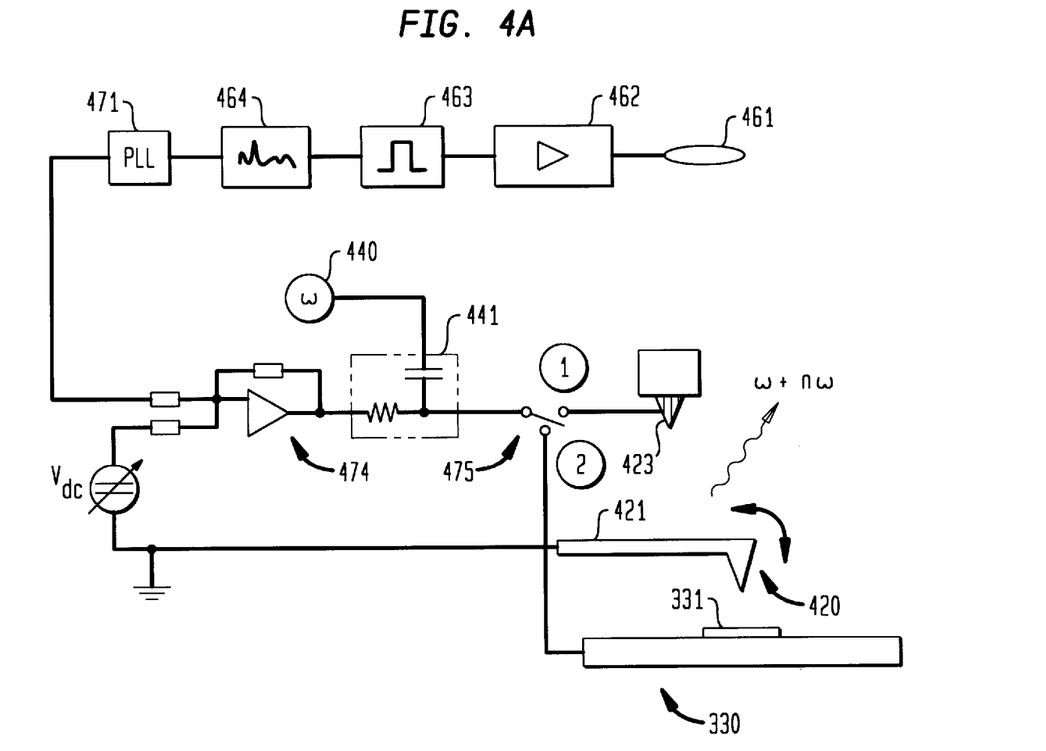
FIGS. 4A, B, C illustrate the use of the invention as instrument for surface investigation with different embodiments.
Figure 4B:
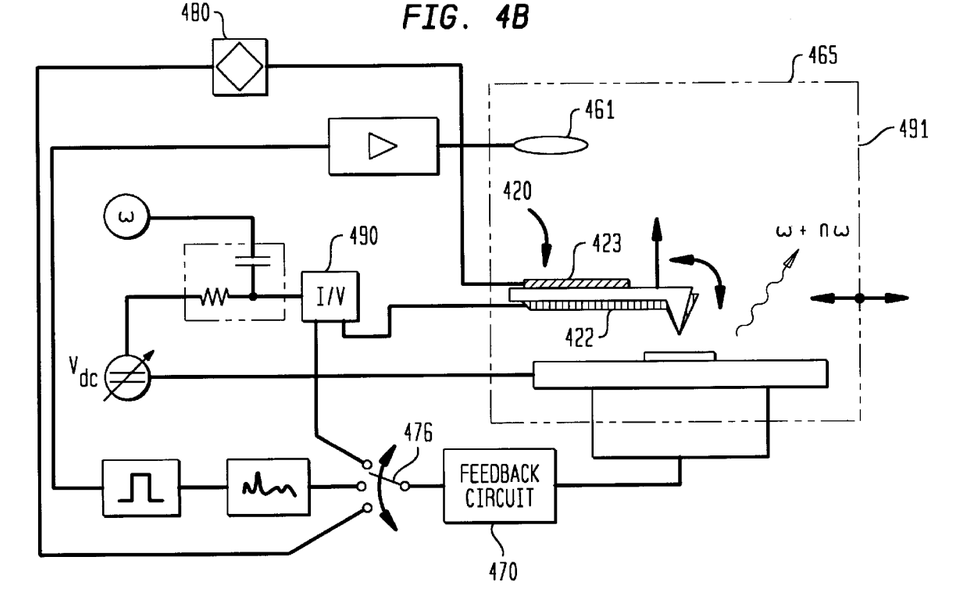
Figure 4C:
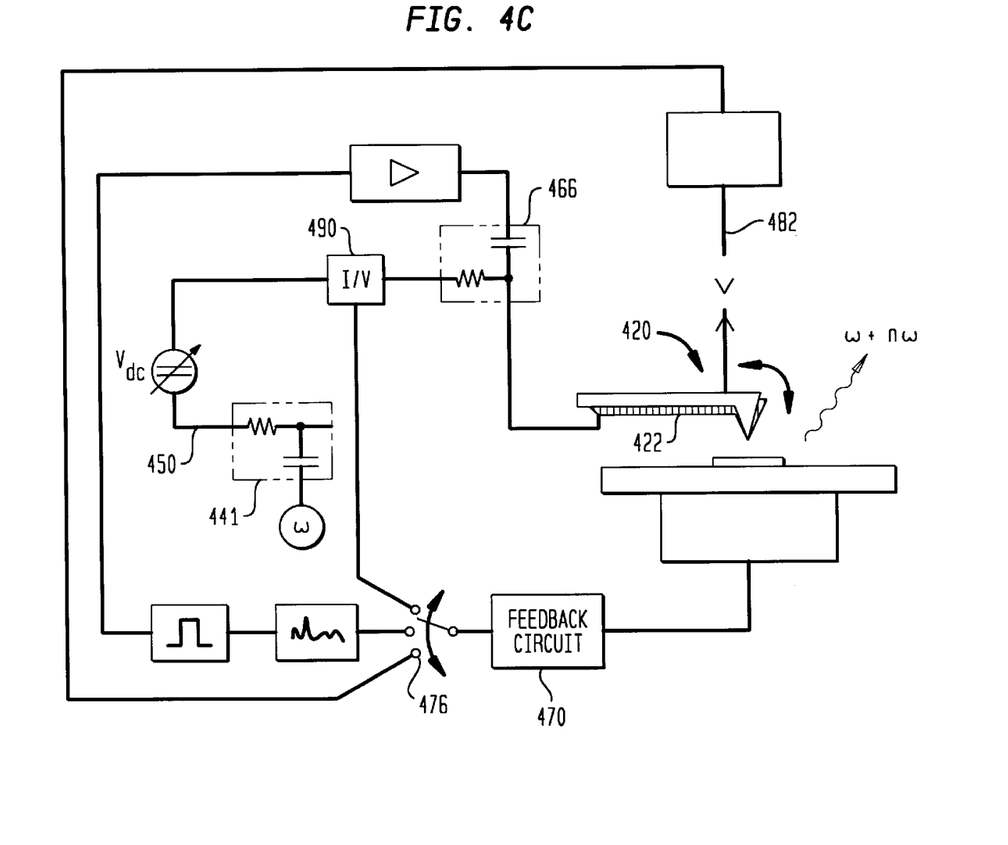

Referring now to FIGS. 4A, 4B, and 4C, variants of a surface inspection tool, e.g. a dopant profiling instrument, according to the invention are shown. The first variant, as depicted by FIG. 4A, an electrostatically excited version of the invention as described above (FIG. 3A), is provided with switching means 474. When the switch is in position 1, the detection of the higher harmonic is used for deflection control. In position 2 however the microwave source is connected to the gap between the cantilever 420 and the sample holder 430 making a dopant profiling possible. It is also possible to provide a second microwave source with a second base frequency. Using this particular embodiment it is possible to simultaneously detect the deflection of the cantilever and inspect the surface of a sample.

With respect to the example described above, the dopant profiler of FIGS. 4B and 4C comprises additional means to detect the deflection of the cantilever, said means being based on methods known in principle and partly described above. Examples are shown wherein the deflection of the cantilever is either measured by a piezoresistive method (FIG. 4B) or by a beam deflection apparatus measuring the intensity of a laser beam, reflected by the back of the cantilever (FIG. 4C). However, any other known deflection detection method can be applied instead.

In both embodiments the metal coating 422 of the cantilever 420 is connected to a current/voltage converter 490 to operate the cantilever in an STM mode. A switch 416 now is provided with the feedback circuit 470 which allows to choose automatically between different input signals. The switch can be either programmed or controlled by an external device, if for example the topology of the sample is accurately known, which is the case in IC manufacturing. As an alternative, the deflection is monitored with at least a second defection detection method, parallel to the one which currently supplies the input signal to the feedback circuit 470. In the latter case the switch 476 automatically alters its position when the currently applied signal deviates significantly from its expected values.

Both variants as shown in FIGS. 4B and 4C differ in the way, in which the radiation emanating from the gap area is received: The embodiment of FIG. 4B includes a tunable cavity 465 as described for example by Michel et al., allowing a preselection of the signal frequency and a very sensitive detection of radiation with a narrow bandwidth. The cavity has conductive walls enclosing the cantilever with one of the walls 491 being moveable relative to the others. In this embodiment the use of a deflection measurement method is preferred which does not interfere with the properties of the cavity as a resonator. Therefore, a piezoresistive layer 423 is incorporated into the cantilever body 420. The piezoresistive element is part of mainly a Wheatstone bridge arrangement 480 to measure its resistance and therewith derive the deflection of the cantilever 420. The piezoresistive layer can be replaced by piezoelectric elements, which produce a voltage in sympathy with the bending of the cantilever.

In the embodiment of FIG. 4C, no cavity is used and the antenna is formed by the conductive coating 422 of the cantilever. Input and output paths of the high frequency signal are separated from the DC circuit 450 by bias-tee elements 441, 466. As said above, the absence of a cavity allows to use a broader variety of deflection measuring methods. In the shown embodiment the intensity of a reflected laser beam 482 is measured, whereby this intensity depends on the bending of the cantilever 420.

It is seen as an obvious task for a skilled person to combine different elements of the aforedescribed embodiments, in particular to select a specific way of coupling the input signal to the gap and coupling the output signal to the amplifier cascade, to replace the conductive coating of the cantilever by a cantilever made of conductive base material, or to replace the coating by a piggybacked tip as shown in FIG. 3A.

Figure 5A:
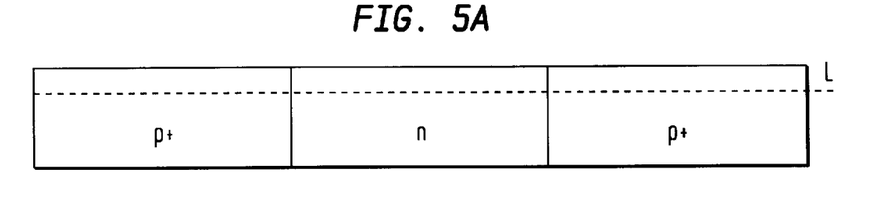
FIGS. 5A, B illustrate experimental results.
Figure 5B:
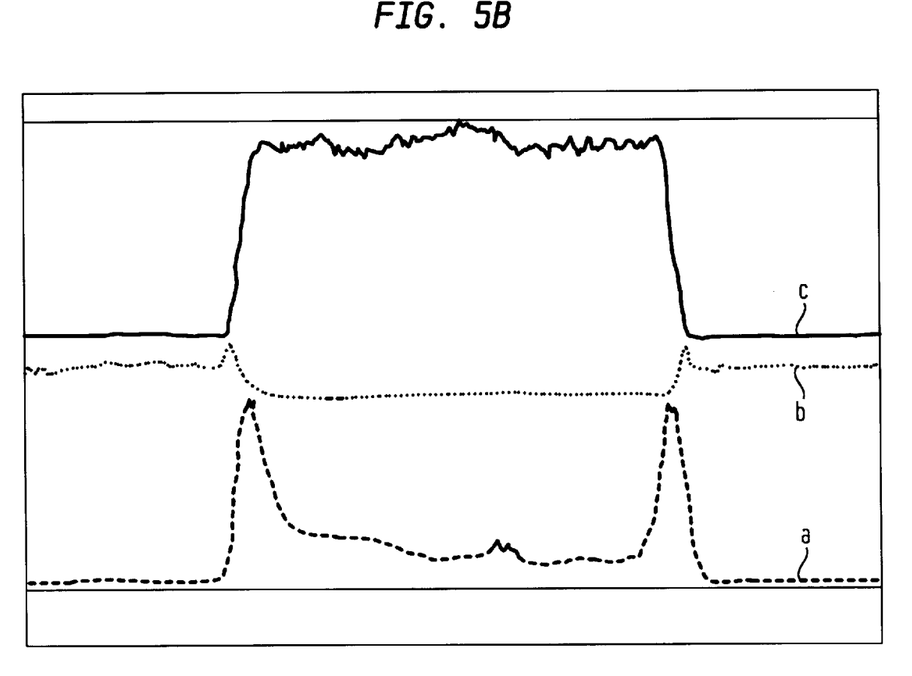
Figure 6A:
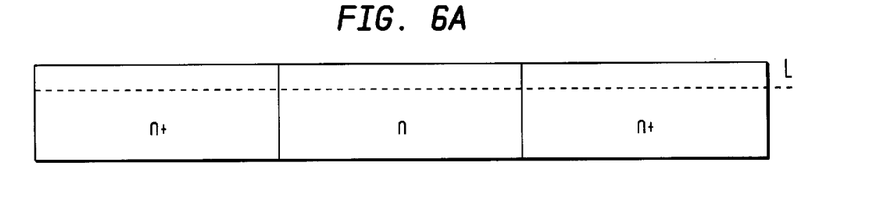
FIGS. 6A, B, C illustrate further experimental results.
Figure 6B:
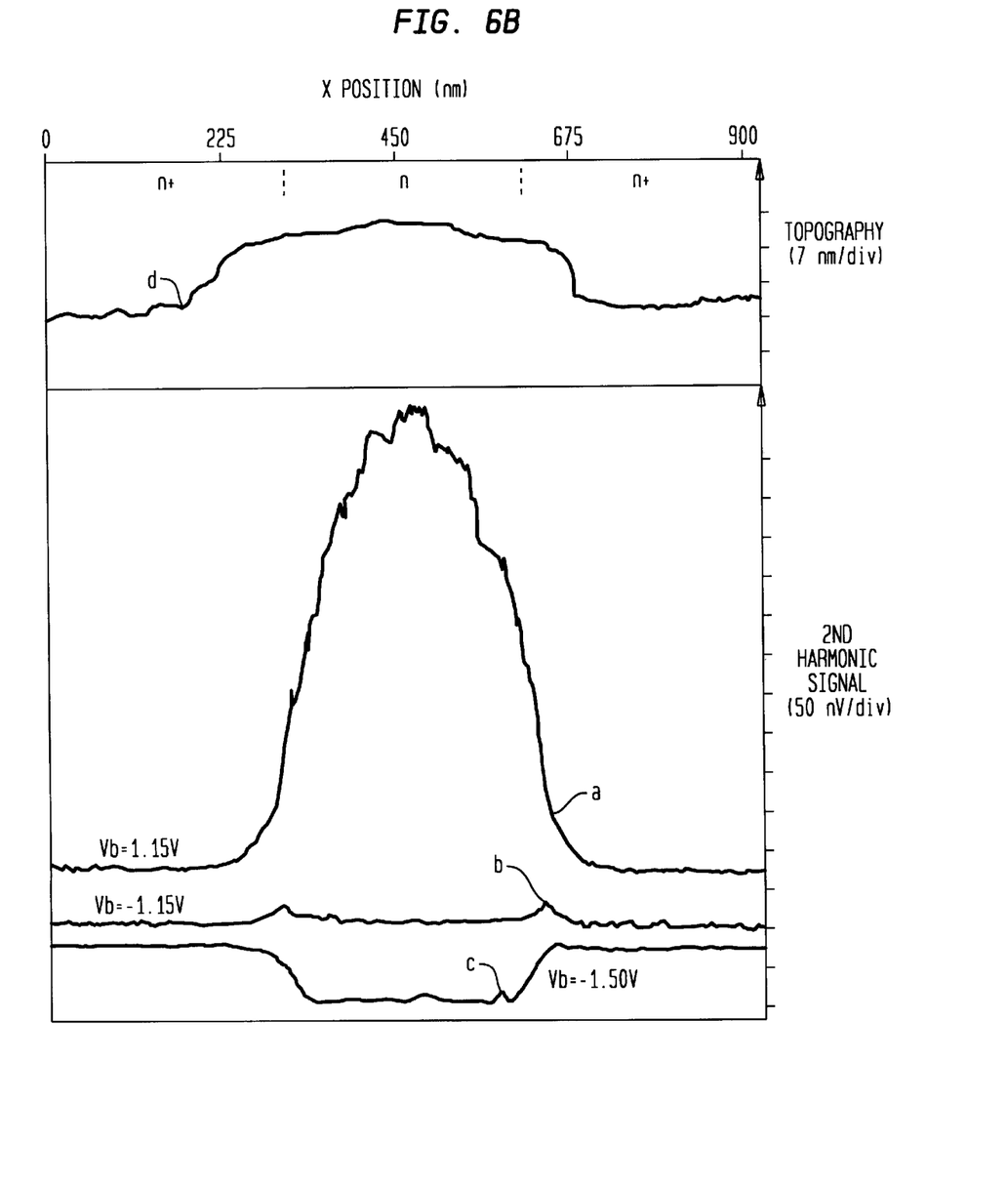
Figure 6C:
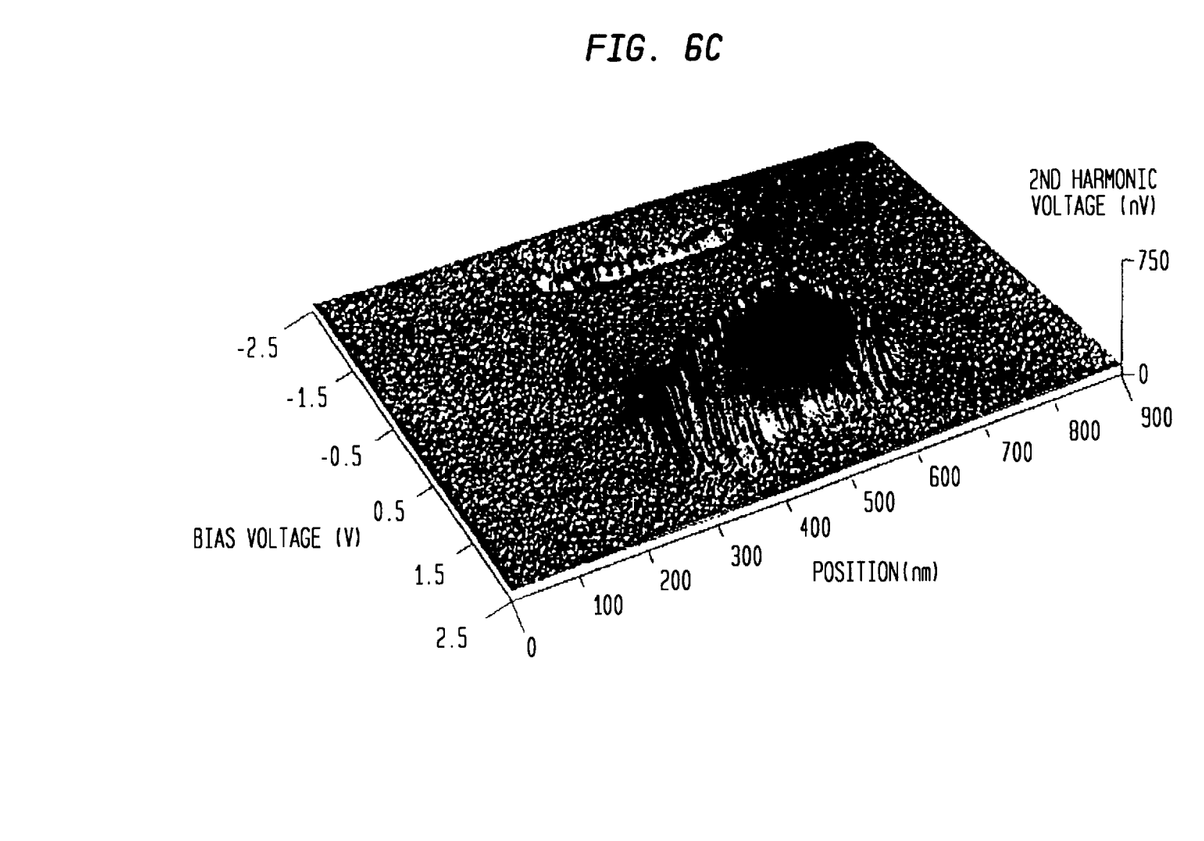

As said above, the new microscope in accordance with the invention is advantageously used to characterize the surface of integrated circuits (IC). FIGS. 5 shows results obtained by investigating an n-type silicon sample doped with boron ions. FIG. 5A depicts the sample structure consisting of alternating stripes of n and p+ doped silicon. Each stripe has a width of approximately ten $\mu$m. Such a grating can be found in a similar form as source/channel/drain area of the PMOS device. In FIG. 5B the intensity of the second harmonic signal is shown as a function of the bias voltage and the position of the tip along a line running perpendicularly to the n and p+ doped stripes. The line-scans are taken at −1.45 V (a), −0.55 V (b), and 1.2 V (c), respectively. For reasons of clarity, the origins of the curves are shifted and curve b is enlarged by a factor of 5. Using these scans regions having a high concentration of dopants can be distinguished from regions with a low concentration, or from depletion zones. FIG. 6 shows similar results gained by investigating a sample doped with arsenic (n+). The linesscans, taken with a bias voltage of 1.15 V (a), −1.15 V (b), and −1.50 V (c), respectively, clearly show the lateral dopant profile. The peak amplitude is much larger in the low-doped regions than it is in the high-doped regions. The resolution found lies below 35 nm. The resolution can be enhanced by controlling the humidity within the microscope. A simultaneously recorded line-scan (d) shows the physical height of the sample as measured in the STM and AFM operation mode of the microscope. The measurement is also depicted in a three-dimensional plot (FIG. 6C) with the horizontal axes being the bias voltage in volts and the position in nanometer, respectively. The vertical axis gives the second harmonic signal in nanoVolts (nV).

We claim:

1. An apparatus for measuring a force exerted upon or a deflection of a flexible cantilever used in atomic force microscopy, comprising means for providing a single high fundamental frequency signal w between the flexible cantilever and a second surface, antenna means for receiving radiation produced during atomic force microscopy of a sample using said cantilever, amplifying means for detecting from the radiation received by the antenna a higher harmonic nw of the fundamental frequency and generating a signal therefrom for use to measure a characteristic of the sample, and means to apply in operation a DC voltage to said cantilever.

2. The apparatus in accordance with claim 1, wherein the amplifying means are designed to operate in a frequency range of 10 Mhz to 100 Ghz.

3. The apparatus in accordance with claim 1, wherein either one of the cantilever, a holding means for the sample, or a reference plane or tip form a part of the antenna means.

4. The apparatus in accordance with claim 1, further comprising means for exciting oscillations of the cantilever.

5. The apparatus in accordance with claim 1, further comprising means for applying a high frequency electrical signal to a gap between the cantilever and the sample, or to a gap between the cantilever and a reference plane or tip.

6. The apparatus in accordance with claim 1, further comprising a cavity with conductive walls enclosing the cantilever, one of said walls being movable relative to other of said walls.

7. The apparatus in accordance with claim 1, wherein the cantilever comprises electrically conductive material.

8. The apparatus in accordance with claim 1, adapted to be used as dopant profiler, further comprising magnetic or piezoelectric actuator means for controlling the distance between the cantilever and a surface of the sample, force detection means for measuring the deflection of the cantilever, and switchable feedback means for controlling said actuator means, said feedback means being switchable to said force detection means or to the output of the amplifying means.

9. The apparatus in accordance with claim 1, adapted to be used as dopant profiler, further comprising magnetic or piezoelectric actuator means for controlling the distance between the cantilever and the surface of the sample, means for detecting a tunnel current between a tip of the cantilever and the sample, force detection means for measuring the deflection of the cantilever, and switchable feedback means for controlling said actuator means, said feedback means being switchable to said tunnel current, to said force detection means, or to the output of the amplifying means.

10. The apparatus in accordance with claim 1, including means for positioning a sample, means for processing measured force or deflection signals to generate a screen display, and means for permanently storing the processed force or deflection signals on a magnetic medium.

11. The apparatus of claim 1 including means for providing a dopant profile of a semiconductor device based on the harmonic frequency nw.

12. A method for measuring a force exerted upon or a deflection of a flexible cantilever used in atomic force microscopy, comprising steps of: generating a single high frequency radiation signal w from a single source in a gap between said cantilever and a second surface during the performance of atomic force microscopy on a sample, receiving and amplifying a higher harmonic nw of the single high frequency signal of said radiation signal w and determining physical characteristics of the sample using the higher harmonic.

13. The method in accordance with claim 12, wherein oscillations of the flexible cantilever are excited by an externally applied force.

14. The method in accordance with claim 13, wherein oscillations of the flexible cantilever are excited by an externally applied electrical signal.

15. The method of claim 14 where said sample is a semiconductor item and n is equal to two to distinguish areas with high dopant concentrations from areas with low dopant concentration.

16. The method in accordance with claim 12, applied for investigating surface and/or volume properties of a sample.

17. The method of claim 12 using the harmonic signal nw to define surface characteristics to the sample.

18. An apparatus for measuring a force exerted upon or a deflection of a flexible cantilever used in atomic force microscopy, comprising antenna means for receiving radiation produced during atomic force microscopy of a sample using said cantilever, amplifying means for detecting the antenna output and generating a signal therefrom, a cavity with conductive walls enclosing the cantilever, with one of said walls being moveable relative to the others, and means to apply in operation a DC voltage to said cantilever.

19. An apparatus for use as a dopant profiler by measuring a force exerted upon or a deflection of a flexible cantilever used in atomic force microscopy, comprising the antenna means for receiving radiation produced during atomic force microscopy of a sample using said cantilever, amplifying means for detecting the antenna output and generating a signal therefrom, magnetic or piezoelectric actuator means for controlling the distance between the cantilever and a surface of the sample, force detection means for measuring the deflection of the cantilever, switchable feedback means for controlling said actuator means, said feedback means being switchable to said force detection means or to the output of the amplifying means, and means to apply in operation a DC voltage to said cantilever.

20. An apparatus for use as a dopant profiler by measuring a force exerted upon or a deflection of a flexible cantilever used in atomic force microscopy, comprising antenna means for receiving radiation produced during atomic force microscopy of a sample using said cantilever, amplifying means for detecting the antenna output and generating a signal therefrom, a magnetic or piezoelectric actuator means for controlling the distance between the cantilever and a surface of the sample, means for detecting a tunnel current between a tip of the cantilever and the sample, force detection means for measuring the deflection of the cantilever, switchable feedback means for controlling said actuator means, said feedback means being switchable to said tunnel current, to said force detection means, or to the output of the amplifying means, and means to apply in operation a DC voltage to said cantilever.

* * * * *